United States Patent
Schmitt et al.

(10) Patent No.: US 11,630,860 B2
(45) Date of Patent: Apr. 18, 2023

(54) SYSTEM AND METHOD FOR THE MIGRATION OF LEGACY DIGITAL CONTENT

(71) Applicant: ARRIS ENTERPRISES LLC, Suwanee, GA (US)

(72) Inventors: Ernest George Schmitt, Maple Glen, PA (US); Carl A. Burger, Hatboro, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/236,412

(22) Filed: Apr. 21, 2021

(65) Prior Publication Data

US 2021/0342391 A1   Nov. 4, 2021

Related U.S. Application Data

(60) Provisional application No. 63/017,894, filed on Apr. 30, 2020.

(51) Int. Cl.
*G06F 16/71* (2019.01)
*G06F 21/60* (2013.01)

(52) U.S. Cl.
CPC .......... *G06F 16/71* (2019.01); *G06F 21/602* (2013.01)

(58) Field of Classification Search
None
See application file for complete search history.

(56) References Cited

U.S. PATENT DOCUMENTS

| | | | | |
|---|---|---|---|---|
| 9,602,862 | B2 * | 3/2017 | Williams | H04N 21/436 |
| 10,939,156 | B1 * | 3/2021 | Subramanian | H04N 21/4147 |
| 2006/0127037 | A1 * | 6/2006 | Van Hoff | H04N 5/85 386/250 |
| 2011/0247038 | A1 * | 10/2011 | Roberts | H04N 21/47 386/E5.003 |
| 2014/0164760 | A1 * | 6/2014 | Hybertson | H04N 21/4402 713/153 |
| 2015/0019487 | A1 * | 1/2015 | Buehne | G06F 16/119 707/632 |
| 2017/0264921 | A1 * | 9/2017 | Milne | H04N 21/482 |
| 2017/0264926 | A1 * | 9/2017 | Milne | H04N 21/632 |
| 2019/0340384 | A1 * | 11/2019 | Huang | H04N 21/26258 |

* cited by examiner

*Primary Examiner* — Richard L Bowen
(74) *Attorney, Agent, or Firm* — Panitch Schwarze Belisario & Nadel LLP

(57) ABSTRACT

A system and method enabling an upgraded digital recorder to detect, retrieve, decrypt, encrypt and securely store digital content retrieved from one or more legacy digital recorders. The legacy digital recorder is placed into a mode permitting access to stored digital content. An upgraded digital recorder then interfaces with the legacy digital recorder and mutual authentication is performed. Following successful authentication, the upgraded digital recorder disables most of the legacy digital recorder's functionality. Utilizing a digital key protecting the stored content from unauthorized access, the upgraded digital recorder retrieves and decrypts the digital content from the legacy digital recorder. The decrypted content is then analyzed and if needed converted to a format compatible with the upgraded digital recorder. The digital content is then indexed, encrypted and stored in the upgraded digital recorder. This process can be enabled via head-end provisioning and therefore requires little or no consumer or technician participation.

28 Claims, 4 Drawing Sheets

SYSTEM AND METHOD FOR THE MIGRATION OF LEGACY DIGITAL CONTENT

CROSS-REFERENCE TO RELATED APPLICATION

This application claims the benefit of U.S. Provisional Patent Application No. 63/017,894, filed Apr. 30, 2020, which is incorporated by reference herein in its entirety.

BACKGROUND OF THE INVENTION

With the increased availability of residential broadband delivery of digital content, including video, and the ever-growing number and variety of digital content sources, consumers are storing more content than ever on digital recorders (including digital video recorders or DVRs). Many residences may even have multiple digital recorders to meet the demands for content storage within a given household. These devices, often integrated into set-top boxes, offer consumers a convenient means of capturing one or more live streams of digital content for later and/or repeated viewing. However, consumers and service providers often desire to replace older, "legacy" digital recorders for a variety of reasons, including upgrading device features and capacity.

Unfortunately, the digital content stored within legacy digital recorders is not readily accessible for downloading to external devices (hard-drive, solid-state memory). Typically, the stored content is encrypted and the file structure under which it is stored is inaccessible to the consumer. Even in those digital recorder systems that do support the use of external memory devices for content storage, the external content is encrypted and structured so as to be inaccessible to the consumer.

Consequently, when an upgraded digital recorder is installed in a residence, a process that is often performed by an untrained consumer, the content stored upon the legacy digital recorder is often relinquished. This problem is compounded when a residence has more than one legacy digital recorder. Clearly, the loss of such legacy content, much of which a consumer might view as difficult and perhaps even costly to replace, is not an ideal situation for either the consumer or the content provider. The situation can even result in some consumers objecting to the installation of upgraded equipment.

There exists a need for a system and method providing an improved process for the detection, preservation and migration of stored legacy digital recorder content onto an upgraded digital recorder.

BRIEF SUMMARY OF THE INVENTION

A system and method enabling an upgraded digital recorder to detect, decrypt, retrieve, index and securely store digital content retrieved from one or more legacy premises digital recorders. The system and method that enables a legacy digital recorder to be placed into a mode permitting access to stored digital content. An upgraded digital recorder then interfaces with the legacy digital recorder and a mutual authentication is performed. Most of the legacy digital recorder's functionality is disabled at this juncture so that activity on the legacy digital recorder does not interfere with the migration process. Utilizing a digital key protecting the stored content from unauthorized access and obtained via the legacy digital recorder, the upgraded digital recorder retrieves and decrypts the digital content from the legacy digital recorder. The decrypted content is then analyzed and if needed converted to a format compatible with the upgraded digital recorder. The retrieved content is then indexed, encrypted and stored in the upgraded digital recorder. The transferred contents may then be erased on the legacy digital recorder. The newly migrated content can be accessed from the upgraded digital recorder in the same manner as natively recorded content. The migration can be enabled via head-end provisioning and therefore requires little or no consumer or technician participation.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
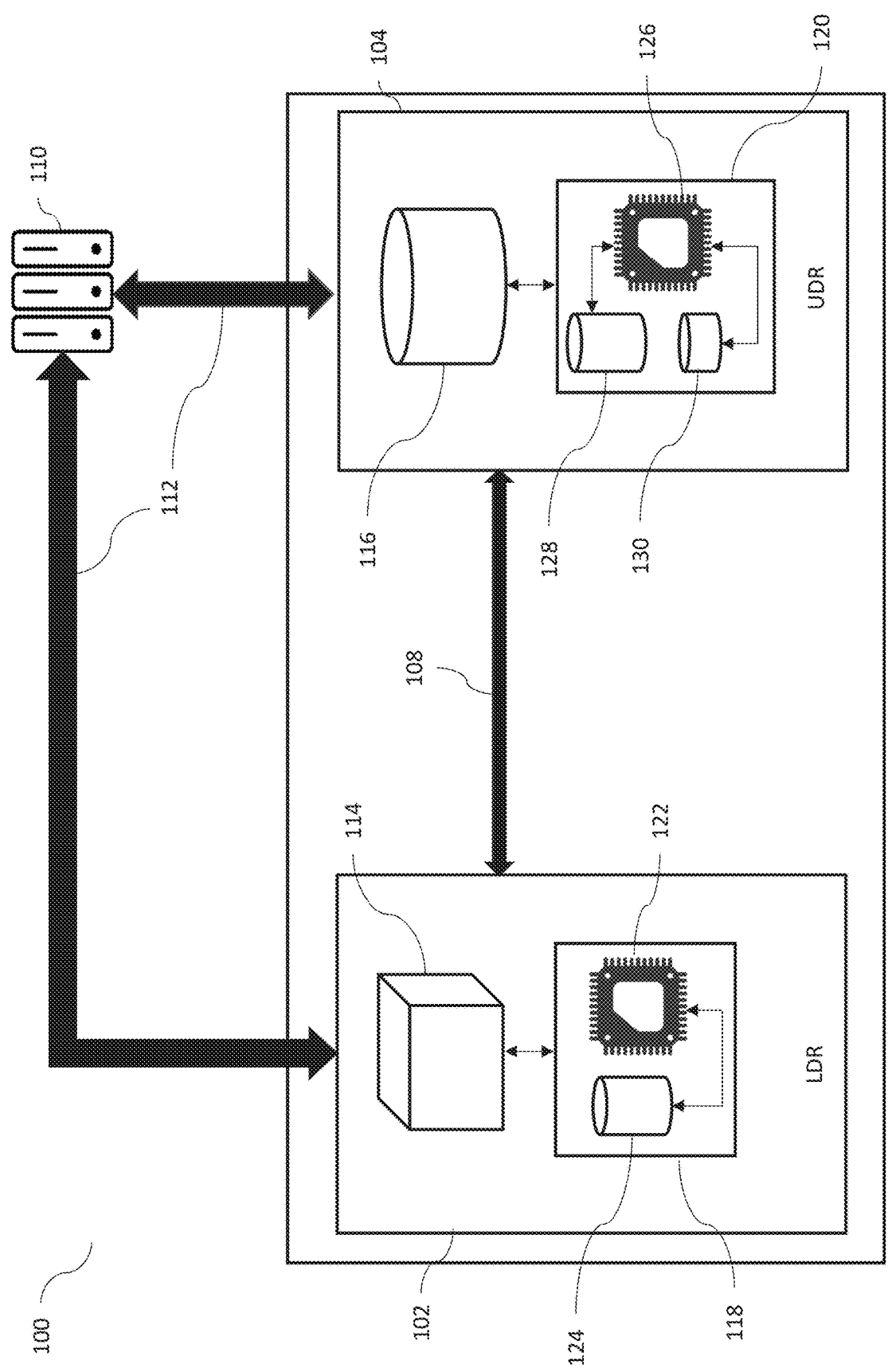
FIG. 1 is a functional block diagram of a system supporting the first preferred process for the migration of stored digital content when upgrading a legacy digital recorder.

FIG. 1 provides a functional block diagram of system 100 which supports the migration of stored digital content from a legacy digital recorder ("LDR") to an upgraded digital recorder ("UDR"). As shown, the system includes LDR 102 and UDR 104, both located within customer premises 106 and linked by premises broadband network 108. Broadband network 108 can be a wired or wireless network capable of supporting broadband, bidirectional communications between the digital recorders. In addition, LDR 102 and UDR 104 are shown be linked to headend 110 by broadband network 112. Each of the digital recorders (LDR 102 and UDR 104) include a stored digital content memory (114 and 116, respectively), as well as a controller (controller 118 and 120, respectively).

Controller 118 comprises one or more processors (122) as well as a memory (124) storing instructions and data defining the operation and functionality of LDR 102. The instructions and data that provide for how LDR 102 stores, retrieves, manages, encrypts and decrypts content, as well as the generation and management of a user interface and the protocols and keys used to facilitate communication with headend 110.

Similarly, controller 120 in UDR 104 also comprises one or more processors (126) and a memory (128) that stores the instructions and data defining the operation and functionality of UDR 104. However, memory 128 contains an additional cache of a specialized instructions and data (130) designated "asset mitigation". The asset mitigation information provides processor 126 with instructions that enable UDR 104 to interface with a legacy DIGITAL RECORDER, acquire previously stored digital content within that legacy DIGITAL RECORDER, and store it within 116 so that it may be accessed for viewing. Furthermore, the asset mitigation information permits UDR 104 to perform this in an automatic manner once it is in communication with a headend and a legacy DIGITAL RECORDER.

Figure 2:
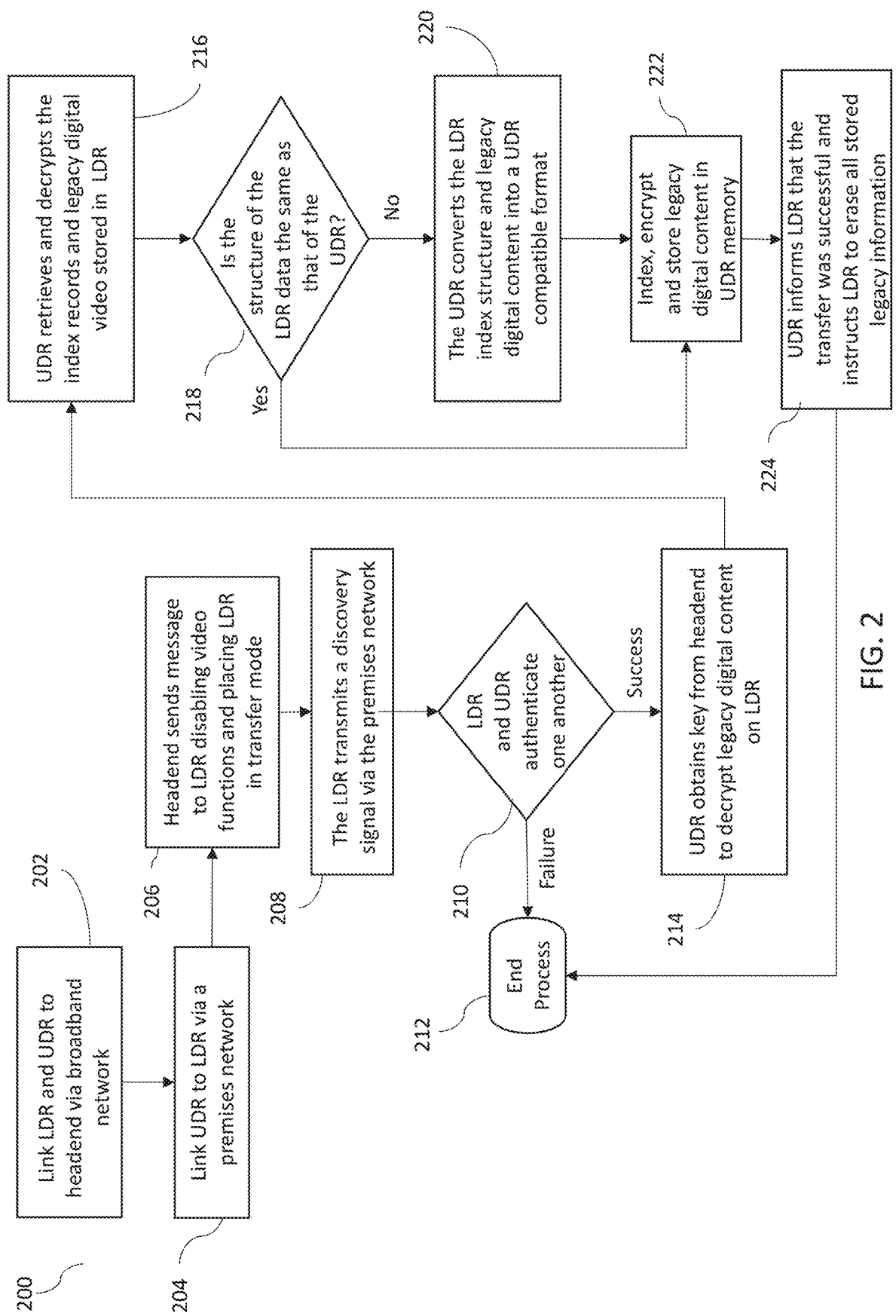
FIG. 2 is a flow diagram of the process supported by the system of FIG. 1 enabling an upgraded digital recorder to acquire previously stored digital content from a legacy digital recorder.

FIG. 2 provides a flow diagram of a preferred process (200) for UDR 104 to acquire legacy digital content from LDR 102. As shown, the process initiates with LDR 102 and UDR linked to a headend via a broadband network (step 202). This is the state in which premises equipment, such as a digital recorder, is normally maintained. In step 204, UDR links to LDR via premises network 108. Headend 110 then sends a message to LDR 102 via broadband network 112 to disable all normal storage and retrieval functions of LDR 102 and place the device into a transfer mode (step 206). In this transfer mode, LDR 102 becomes receptive to the transferring of legacy digital content to an authorized device. LDR 102 then transmits a "discovery signal" for reception by UDR 104 over premises network 108 (step 208). This message identifies LDR 102 as source of legacy digital content.

In step 210 LDR 102 and UDR 104 mutually authenticate via premises network 108. This authentication can utilize any appropriate protocols, such as HTTP or HTTPS. The authentication ensures that any data transfer only be made between authorized devices, and the security of the legacy digital content maintained. If the authentication fails at any point, the transfer process is terminated (step 212). However, if the DIGITAL RECORDERs successfully authenticate, UDR 104 then obtains from LDR 102 a digital key for decrypting the legacy digital content stored within LDR 102 (step 214). Utilizing the digital key, UDR 104 retrieves and decrypts the legacy digital content and the associated index records from LDR 102 (step 216).

Next, in step 218, UDR makes a determination as to the compatibility of LDR 102's content index data and legacy digital content. UDR 104 is likely being installed for one of two reasons, a) it represents an equipment upgrade over the technology of LDR 102, or b) LDR 102 is malfunctioning. If it is the latter, there is a possibility that LDR 102 and UDR 104 share the same level of technology, functionality and capacity. If the content index data and legacy digital content within LDR 102 is determined to be incompatible with LDR 104 (likely the case with respect to scenario a), then the process continues with step 220, and UDR 104 performs a conversion of both the index data and the legacy digital content making it suitable for storage in UDR 104. The converted digital content is then indexed, encrypted and stored in UDR 104 (step 222). However, if at step 218 the index data and legacy digital content within LDR 102 is determined to be entirely compatible with LDR 104 (a possibility with respect to scenario b), there will be no need for conversion and the process continues by storing the transferred digital content (step 222).

The process then proceeds with step 224, and UDR 104 informs LDR 102 that the transfer was successful. This notification can also include an instruction for LDR 102 to erase all information related to the transferred digital content. In response, LDR 102 deletes all index and stored content related to such, and the process terminates with step 210. Step 224 is not critical to the transfer and preservation of the legacy digital content, which is now securely stored in UDR 104. However, erasing the index and legacy digital content of LDR 102 enforces transfer of a single copy of the legacy digital content without leaving a useable duplicate and places LDR in better condition for efficient recycling by the content provider to which it will likely be returned.

Figure 3:
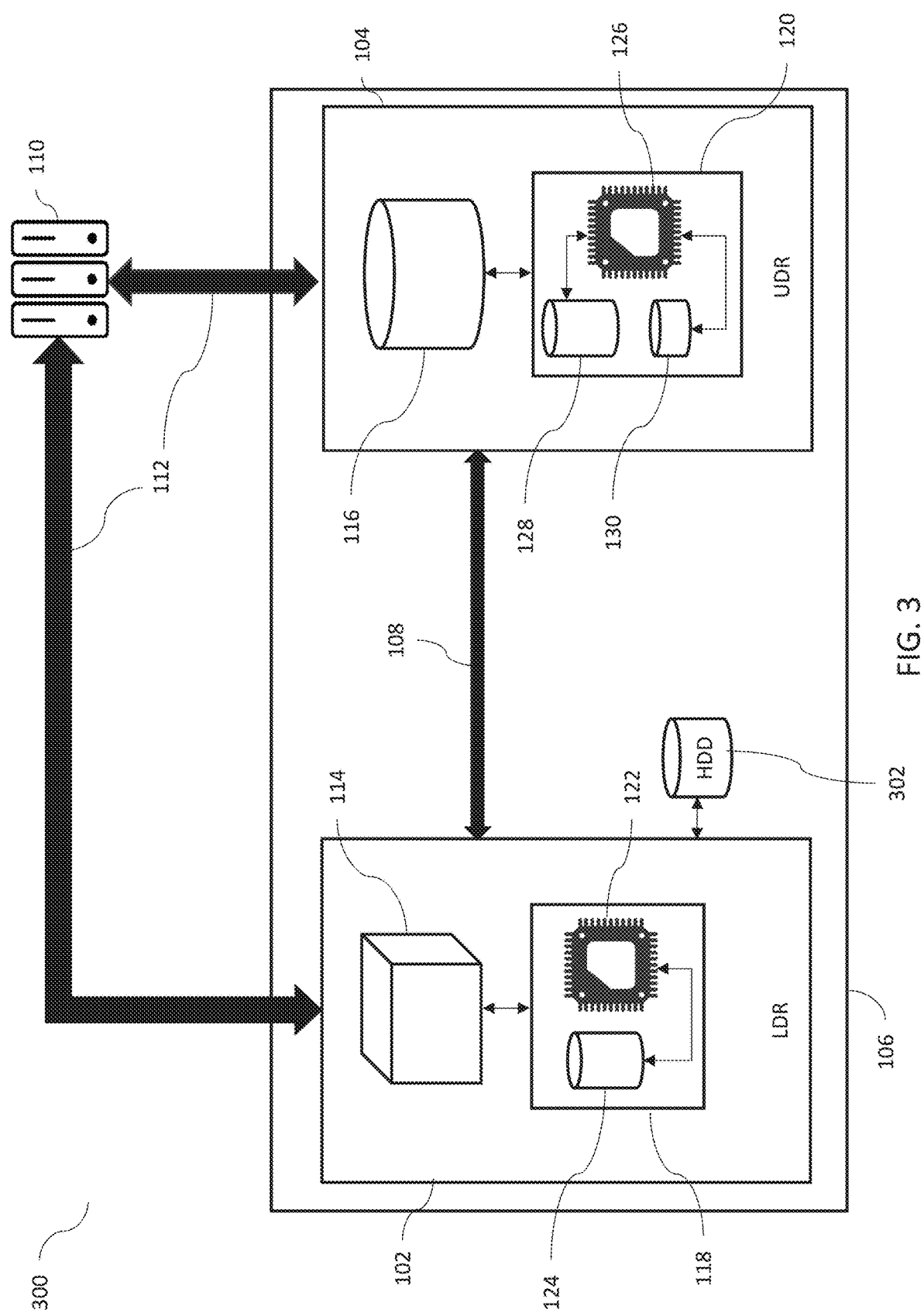
FIG. 3 is a functional block diagram of a system supporting a second preferred process for the migration of stored digital content when upgrading a legacy digital recorder.

FIG. 3 provides a functional block diagram of a system supporting the migration of legacy digital content from a legacy digital recorder (which includes an external hard drive storing encrypted digital content) to an upgraded digital recorder. As shown, the system includes all of the elements that the system of FIG. 1 included, and each of these elements operates in much the same manner as described above with respect to process 200 to accomplish the transfer of encrypted digital content from LDR 102 to UDR 104.

However, system 300 does include an element that separates it from system 100. In system 300 the storage capacity of LDR 102 has been augmented by external hard-drive 302, which is interfaced with LDR 102 and stores encrypted and indexed legacy digital content. The process for discovering, and transfer legacy digital content from augmented LDR 102 is much the same as was discussed above with respect to process 200. As shown in FIG. 2, step 216 has a UDR retrieving and decrypting the legacy index records and digital content stored in an LDR. The index records that UDR 104 would retrieve from augmented LDR 102 would provide an indication that a portion of the legacy digital content resides in external hard drive 302, and the legacy digital content on that external drive would be accessed, decrypted, converted (if necessary), and stored on UDR 102 in much the same manner as was done for system 100.

Figure 4:
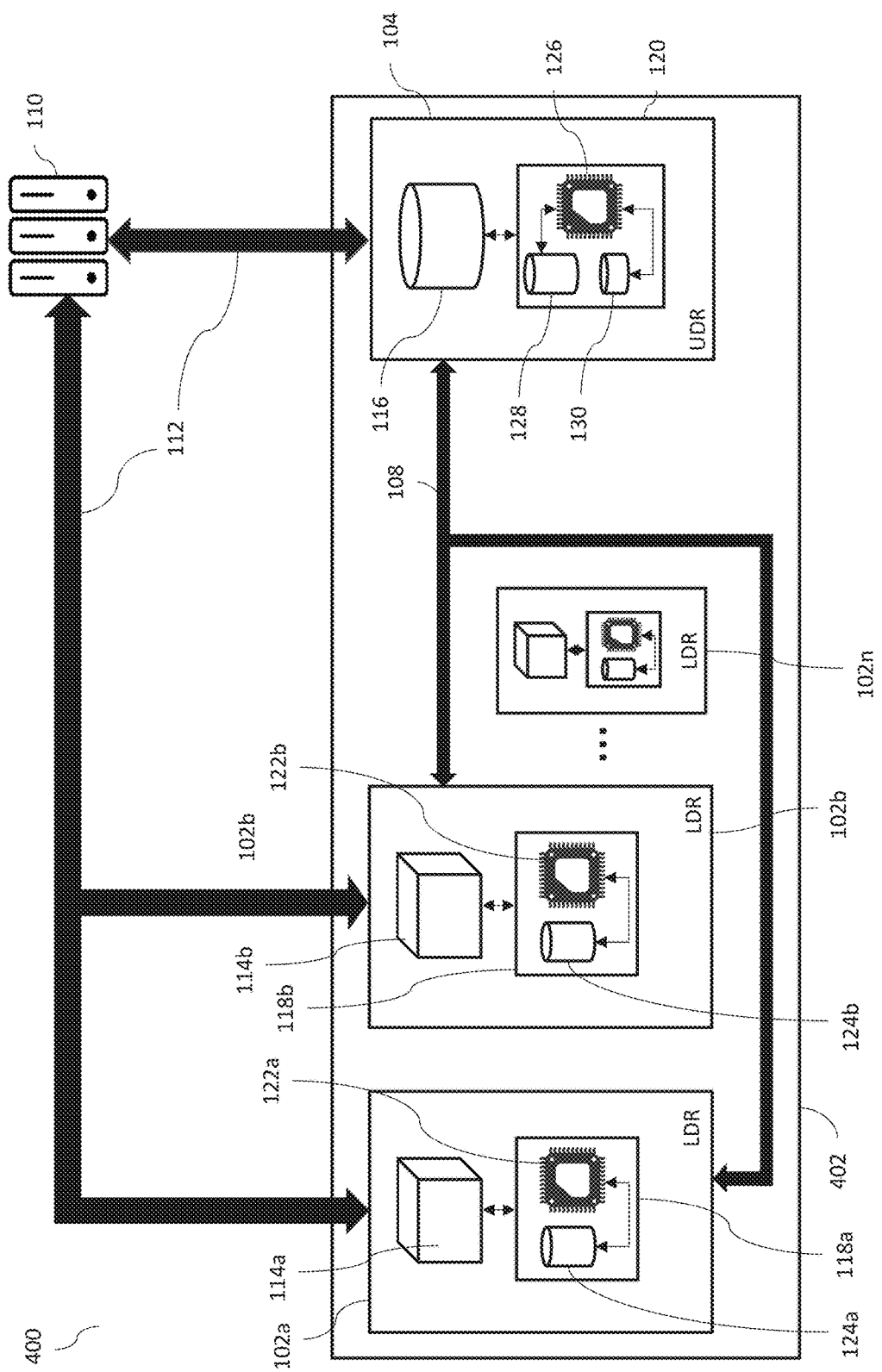
FIG. 4 is a functional block diagram of a system supporting a preferred process for the migration of stored digital content when upgrading a plurality of legacy digital recorders.

FIG. 4 shows a system (400) wherein the digital content of multiple legacy digital recorders is transferred to an upgraded digital recorder. System 400 includes premises network 108, headend 110 and broadband network 112. Each of these elements functions in primarily the same manner as described with respect to system 100. However, system 400 includes two or more legacy digital recorders, LDR 102*a* and LDR 102*b* . . . LDR 102*n*, each of which includes elements that correspond with the similarly numbered elements of LDR 102 (stored legacy digital content memories 114*a* and 114*b* function in a manner similar to stored legacy digital content memory 114, processors 122*a* and 122*b* function in a manner similar to processor 122, etc.).

At step 208 of process 200, LDR 102 transmitted a "discovery signal" for reception by UDR 104 over the premises network. System 300 operates much the same. Both LDR 102*a* and LDR 102*b* would each transmit a unique discovery signal identifying the digital recorders as sources of legacy digital content. UDR 104 would send a message to the LDR corresponding to the first discovery signal received. Assume that the discovery signal transmitted by LDR 102*a* was the first to be received by UDR 104. The process shown in FIG. 2 would proceed between UDR 104 and LDR 102*a* until it terminated at step 212. Upon termination of the process, UDR 104 would receive the discovery signal which LDR 102*b* was still transmitting (step 208 of process 200). Process 200 would then proceed between LDR 102*b* and UDR 104.

The iterative process outlined above would repeat over and over until UDR 104 failed to receive any discovery signals from as many LDRs as were interfaced and transmitted a discovery signal (LDR 102*a*-LDR 102*n*). In this manner, UDR 104 could collect all of the legacy digital content within premises 402 (assuming UDR 104 had sufficient storage capacity.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. For example, UDR 104 could present a user with a list of discovered LDRs via a graphical interface (such as a digital television). The user could then select which LDRs should have their legacy digital transferred to UDR 104, or specify the order in which UDR 104 should address the LDRs. A certain one or more of the LDRs may have legacy content that the user considers particularly valuable and wants transferred to UDR 104 before any capacity issues with UDR 104 arise. Another variation would be for the system and method to provide error messages to indicate a transfer failure, insufficient capacity, an inability to authenticate, etc. These error messages could be transmitted via the premises or broadband networks to the headend, a technician, or to the consumer.

The invention claimed is:

1. A system for the migration of stored indexed digital content, comprising:
   a target digital video recorder for the migration of the stored indexed digital video content, wherein the target digital video recorder comprises at least one memory repository for indexed digital video content, and a controller comprising at least one processor, the controller being adapted to:
   receive at least one signal identifying at least one legacy device from which the indexed digital video content is to be migrated;
   transmit a signal to place the at least one identified device into a state suitable for transmitting the indexed digital video content;
   obtain a digital key associated with the indexed and stored digital video content;
   utilize the digital key to access and retrieve the indexed video digital content from the at least one identified legacy device;
   convert the retrieved indexed digital video content to a format compatible with storage in the at least one memory repository;
   compile an index for the converted indexed digital video content; and
   store the compiled index and the converted indexed digital video content in the at least one memory repository.

2. The system of claim 1 wherein the controller is further to encrypt the converted indexed digital video content prior to storage in the at least one memory repository.

3. The system of claim 1 wherein, the controller is further adapted to transmit, following the storage of the new compiled index and the converted indexed digital video content in the at least one memory repository, an instruction to the at least one identified legacy device to erase all stored indexed digital content stored therein.

4. The system of claim 1 wherein the digital key is obtained from the legacy device.

5. The system of claim 1 further comprising a headend linked to the target digital video recorder.

6. The system of claim 1 wherein the target digital video recorder is linked to the at least one device from which the indexed digital video content is to be migrated by a premises network.

7. The system of claim 1 wherein the indexed digital video content is encrypted.

8. The system of claim 7 wherein controller is further adapted to utilize the digital key to decrypt the indexed digital video content.

9. A method for the migration of stored indexed digital video content comprising the steps of:
   receiving at least one signal identifying at least one legacy device from which the indexed content is to be migrated;
   transmitting a signal to place the at least one identified legacy device into a state suitable for transmitting the indexed digital video content;
   obtaining a digital key associated with the indexed digital video content;
   utilizing the digital key to access and retrieve the indexed digital video content from the at least one identified legacy device;
   converting the retrieved indexed digital video content to a format compatible with storage in the at least one memory repository;
   compiling an index for the converted indexed digital video content; and
   storing the compiled index and the converted indexed digital video content in at least one memory repository.

10. The method of claim 9 further comprising the step of encrypting the converted indexed digital video content prior to storage in the at least one memory repository.

11. The method of claim 9 further comprising the step of transmitting, after the converted indexed digital video content is stored in the at least one memory repository, an instruction to the at least one identified legacy device to erase all indexed digital video content stored therein.

12. The method of claim 9 wherein the signal to place the at least one identified legacy device into a state suitable for transmitting the indexed digital video content via at least one of:
   a premises network; and
   a broadband network.

13. The method of claim 9 wherein the indexed digital video content is encrypted.

14. The method of claim 13 wherein the obtained digital key is utilized to decrypt the indexed digital video content.

15. A system for the migration of stored indexed digital video content, comprising:
   a target digital video recorder for the migration of the stored indexed digital video content, wherein the target digital video recorder comprises at least one memory repository for indexed digital video content, and a controller comprising at least one processor, the controller being adapted to:
   receive at least one signal identifying at least one legacy device from which the indexed digital video content is to be migrated;
   transmit a signal to place the at least one identified legacy device into a state suitable for transmitting the indexed digital video content;
   obtain a digital key associated with the indexed and stored indexed digital video content;
   utilize the digital key to access and retrieve the indexed digital video content from the at least one identified legacy device;
   compile an index for the retrieved indexed digital video content; and
   store the compiled index and the retrieved indexed digital video content in the at least one memory repository.

16. The system of claim 15 wherein the controller is further to encrypt the retrieved indexed digital video content prior to storage in the at least one memory repository.

17. The system of claim 15 wherein, the controller is further adapted to transmit, following the storage of the compiled index and the retrieved indexed digital video content in the at least one memory repository, an instruction to the at least one identified legacy device to erase all stored indexed digital video content stored therein.

18. The system of claim 15 wherein the digital key is obtained from the legacy device.

19. The system of claim 15 wherein the target digital video recorder is linked to the at least one device from which the indexed digital video content is to be migrated by a premises network.

20. The system of claim 15 wherein the indexed digital video content is encrypted.

21. The system of claim 15 wherein controller is further adapted to utilize the digital key to decrypt the indexed digital video content.

22. A method for the migration of stored indexed digital video content comprising the steps of:
   receiving at least one signal identifying at least one legacy device from which the indexed digital video content is to be migrated;
   transmitting a signal to place the at least one identified legacy device into a state suitable for transmitting the indexed digital video content;
   obtaining a digital key associated with the indexed digital video content;
   utilizing the digital key to access and retrieve the indexed digital video content from the at least one identified legacy device;
   compiling an index for the retrieved indexed digital video content; and
   storing the compiled index and the retrieved indexed digital video content in at least one memory repository.

23. The method of claim 22 further comprising the step of encrypting the retrieved indexed digital video content prior to storage in the at least one memory repository.

24. The method of claim 22 further comprising the step of transmitting, after the retrieved indexed digital video content is stored in the at least one memory repository, an instruction to the at least one identified legacy device to erase all indexed digital video content stored therein.

25. The method of claim 22 wherein the digital key is obtained from the legacy device.

26. The method of claim 22 wherein the signal to place the at least one identified legacy device into a state suitable for transmitting the indexed digital video content is transmitted via at least one of:
   a premises network; and
   a broadband network.

27. The method of claim 22 wherein the indexed digital video content is encrypted.

28. The method of claim 22 wherein the obtained digital key is utilized to decrypt.

* * * * *